United States Patent [19]

Ikeura et al.

[11] Patent Number: 5,158,057
[45] Date of Patent: Oct. 27, 1992

[54] SYSTEM AND METHOD FOR CONTROLLING IGNITION TIMING TO SUPPRESS ENGINE KNOCKING USING PERIODIC PSEUDO RANDOM SIGNAL

[75] Inventors: Kenji Ikeura; Masaaki Saito, both of Kanagawa; Nobuo Kurihara, Ibaraki, all of Japan

[73] Assignee: Nissan Motor Company, Limited, Japan

[21] Appl. No.: 636,787

[22] Filed: Jan. 2, 1991

[30] Foreign Application Priority Data

Jan. 12, 1990 [JP] Japan .................................. 2-5377

[51] Int. Cl.$^5$ .............................................. F02P 5/15
[52] U.S. Cl. .................................................. 123/425
[58] Field of Search .............................. 123/425, 435; 364/431.08

[56] References Cited

U.S. PATENT DOCUMENTS

| | | | |
|---|---|---|---|
| 4,640,249 | 2/1987 | Kawamura et al. | 123/425 |
| 4,750,103 | 6/1988 | Abo et al. | 123/425 X |
| 4,760,825 | 8/1988 | Morita | 123/435 X |
| 4,893,600 | 1/1990 | Holmes | 123/419 |
| 4,966,117 | 10/1990 | Kawamura | 123/425 |
| 5,063,901 | 11/1991 | Kaneyasu et al. | 123/436 X |

FOREIGN PATENT DOCUMENTS

| | | |
|---|---|---|
| 3821448 | 1/1989 | Fed. Rep. of Germany . |
| 3910029 | 10/1989 | Fed. Rep. of Germany . |
| 61-182465 | 8/1986 | Japan . |
| 2-169872 | 6/1990 | Japan . |
| 2-238172 | 9/1990 | Japan . |

*Primary Examiner*—Tony M. Argenbright
*Attorney, Agent, or Firm*—Lowe, Price, LeBlanc & Becker

[57] ABSTRACT

A system and method for controlling ignition timing for an internal combustion engine to suppress engine knocking in which a periodic pseudo random signal (for example, M-series sequence signal) is superimposed on an ignition signal provided at an ignition timing, and a cross-correlation function between the periodic pseudo random signal $\bar{x}$ and a knocking signal y is calculated to determine an actual knocking level. The ignition timing is then corrected so that the cross-correlation function coincides with a target value which is defined as a value placed in a vicinity of a knocking limit. The ignition timing for the engine is controlled so as to reach the value in the vicinity of the knocking limit but does not exceed the knocking limit.

12 Claims, 9 Drawing Sheets

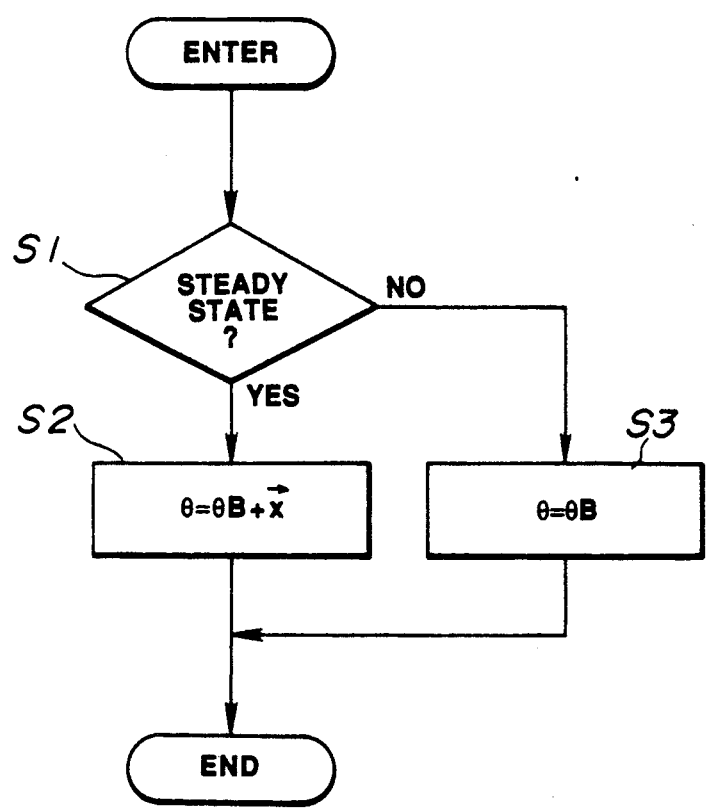

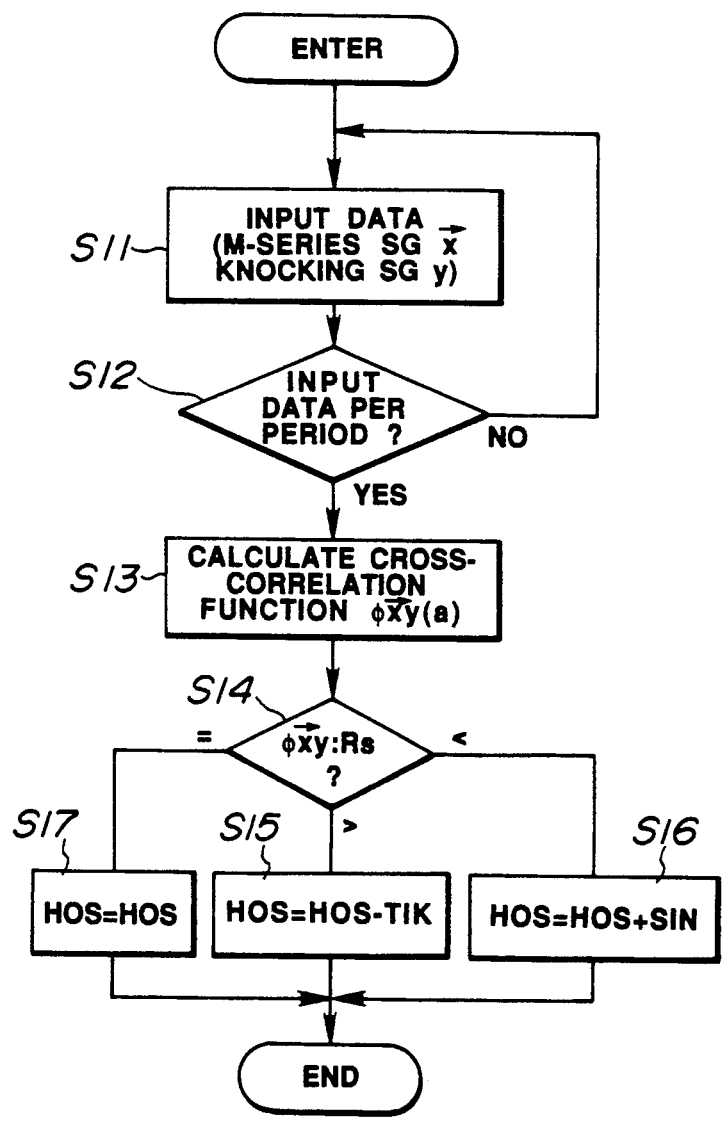

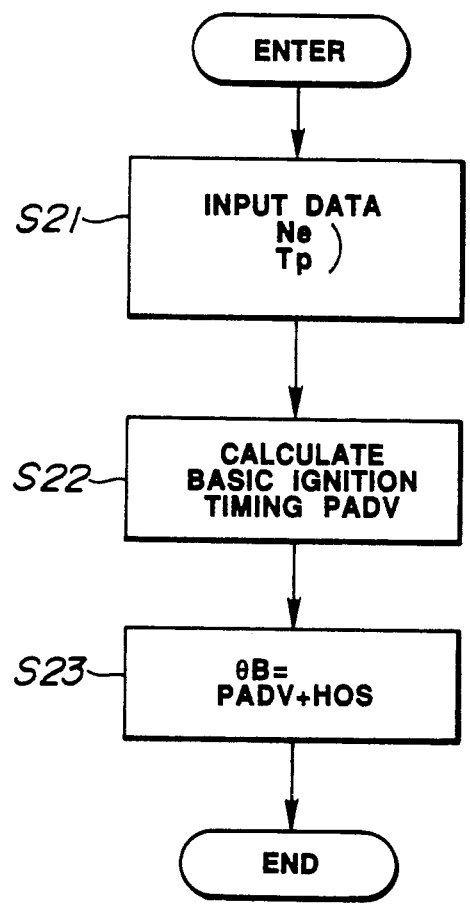

FIG. 6
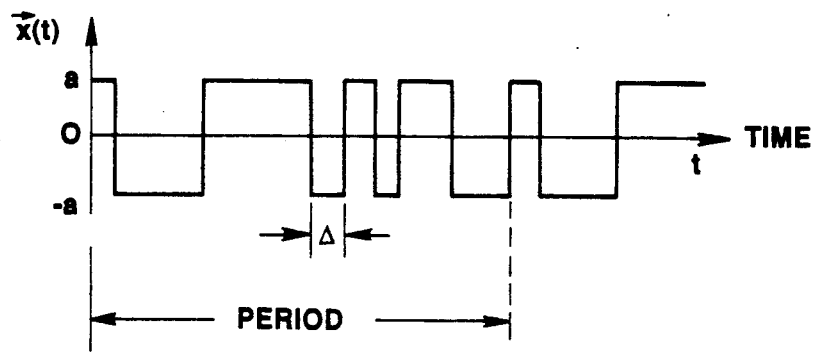
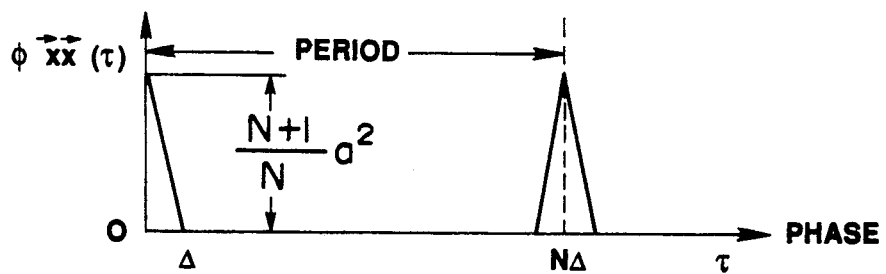

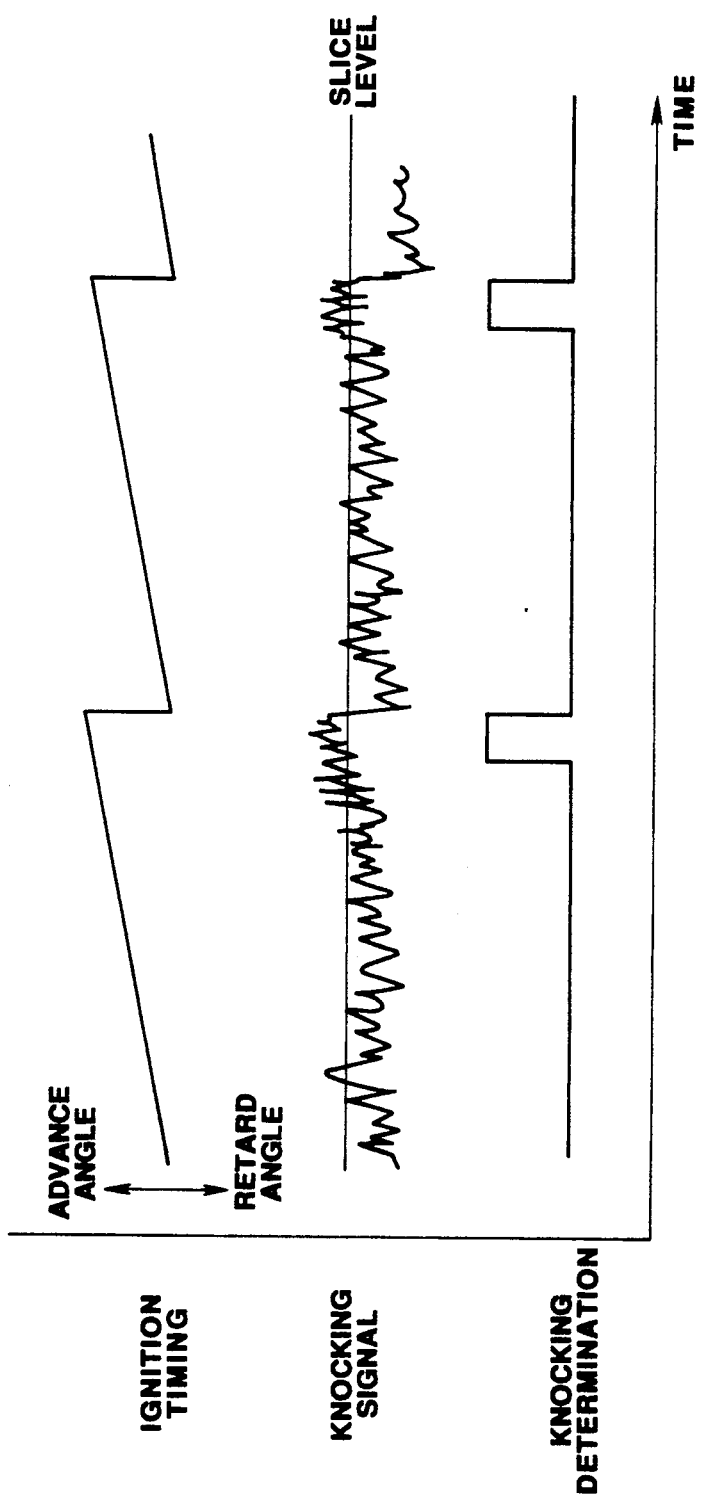

SYSTEM AND METHOD FOR CONTROLLING IGNITION TIMING TO SUPPRESS ENGINE KNOCKING USING PERIODIC PSEUDO RANDOM SIGNAL

BACKGROUND OF THE INVENTION

1. Field of The Invention

The present invention relates generally to a system and method for controlling an ignition timing for an internal combustion engine to suppress engine knocking using a pseudo random signal of minute period.

2. Description of The Background Art

Japanese Patent Application First Publication (Unexamined) No. Showa 61-182465 published on Aug. 15, 1986, exemplifies an ignition timing controlling system in which ignition timing is controlled so as to advance toward an angular position in a vicinity to a knocking limit over which engine knocking occurs and below which no engine failure occurs in order to reduce fuel consumption of the engine.

As appreciated from FIG. 9, as the ignition timing is gradually advanced, an abrupt fuel combustion of the engine is advanced. Accordingly, a level of a signal representing a knocking level becomes increased. A threshold level is provided at a, so-called, knocking limit (an amplitude position over which the knocking level must not exceed to prevent engine deterioration). If the threshold level is compared with an actual knocking level and, then, the actual knocking level exceeds the threshold level, a signal representing a high level (logic high level) is output. A control unit receives the signal, i.e., a determination signal that the signal indicates the high level and controls the ignition timing so as to retard stepwise over a constant width of crank angle when a duration of time during which the high level signal is continued exceeds a predetermined period of time. Then, the control unit progressively advances the ignition timing from the retarded timing angle. In this way, the engine is controlled to an ignition timing in the vicinity to the knocking limit.

However, in the previously proposed ignition timing controlling system, the ignition timing is retarded only when the actual knocking level has exceeded the threshold level for the predetermined period of time. During the time in which the actual knocking level exceeds the threshold level, it follows that the occurrence of knocking cannot be avoided. In other words, as long as the knocking level is exceeded to some degree, the ignition timing is not optimally controlled toward the vicinity to the knocking limit. Consequently, control accuracy of the ignition timing is not always optimum.

SUMMARY OF THE INVENTION

It is therefore a principal object of the present invention to provide a system and method for controlling an ignition timing for an internal combustion engine to suppress engine knocking which can avoid severe occurrence of knocking to some degree and can control the ignition timing to transfer toward a value in the vicinity of a knocking limit.

The above-described objects can be achieved by providing a system for controlling ignition timing for an internal combustion engine, comprising: a) first means for detecting an engine revolution speed and an engine load; b) second means for calculating a basic ignition timing value on the basis of the detected engine revolution speed and engine load; c) third means for generating an ignition signal at a timing calculated by the second means and igniting air-fuel mixture supplied to the engine in response to the ignition signal; d) fourth means for generating a periodic pseudo random signal; e) fifth means for superimposing the periodic pseudo random signal on the ignition signal; f) sixth means for detecting engine knocking and outputting an engine knocking level signal which changes due to the superimposition of the periodic random signal; g) seventh means for calculating a cross-correlation function of both the knocking level signal and pseudo signal; h) eighth means for determining whether the cross-correlation function coincides with a predetermined target value; i) ninth means for calculating an advance/retardation correction coefficient of the ignition timing so that the cross-correlation function coincides with the predetermined target value; and j) tenth means for correcting the basic ignition timing value according to the calculated advance/retardation correction coefficient and determining an output ignition timing value.

The above-described objects can also be achieved by providing a controlling system comprising: a) first means for generating a periodic pseudo random signal; b) second means for superimposing the pseudo signal on a control signal; c) third means for detecting operating parameters from a controlled object and generating the control signal according to the operating parameters; d) fourth means for outputting the superimposed random signal to the controlled object when outputting the control signal thereto; e) fifth means for detecting a result signal from the controlled object which indicates the result of control by the controlled object; f) sixth means for calculating a cross-correlation function between the periodic pseudo random signal and the result signal; g) seventh means for determining whether the cross-correlation function coincides with a predetermined target value; and h) eighth means for varying the control signal according to the result of determination by the seventh means so that the value of the cross-correlation function coincides with the predetermined target value.

According to a further aspect of the present invention, the above-described objects can also be achieved by providing a method for controlling ignition timing for an internal combustion engine to suppress an engine knocking, comprising the steps of: a) detecting an engine revolution speed and an engine load; b) calculating a basic ignition timing value on the basis of the detected engine revolution speed and engine load; c) generating an ignition signal at a timing calculated in the step b) and igniting air-fuel mixture supplied to the engine in response to the ignition signal; d) generating a periodic pseudo random signal; e) superimposing the periodic random signal on the ignition signal; f) detecting engine knocking and outputting an engine knocking level signal which changes due to the superimposition of the periodic random signal; g) calculating a cross-correlation function of both the knocking level signal and pseudo signal; h) determining whether the cross-correlation function coincides with a predetermined target value; i) calculating an advance/retardation correction coefficient of the ignition timing so that the cross-correlation function coincides with the predetermined target value; and j) correcting the basic ignition timing value according to the calculated advance/retardation correction coefficient and determining an output ignition timing value.

BRIEF DESCRIPTION OF THE DRAWINGS

FIG. 2 (B) is a functional circuit block diagram of a knocking detecting unit applicable to the system shown in FIGS. 1 and 2 (A).

FIG. 3 through FIG. 5 are operational flowcharts for explaining control operations in the preferred embodiment shown in FIGS. 1 through FIG. 2 (B).

FIG. 6 is a waveform chart of an M-series sequence signal $\vec{\chi}$ (t) and auto-correlation function denoted by $\phi_\chi(\tau)$.

FIG. 9 is a waveform chart for explaining an operation of a previously proposed ignition timing controlling system described in the BACKGROUND OF THE INVENTION.

DETAILED DESCRIPTION OF THE PREFERRED EMBODIMENTS

Reference will hereinafter be made to the drawings in order to facilitate a better understanding of the present invention.

Figure 1:
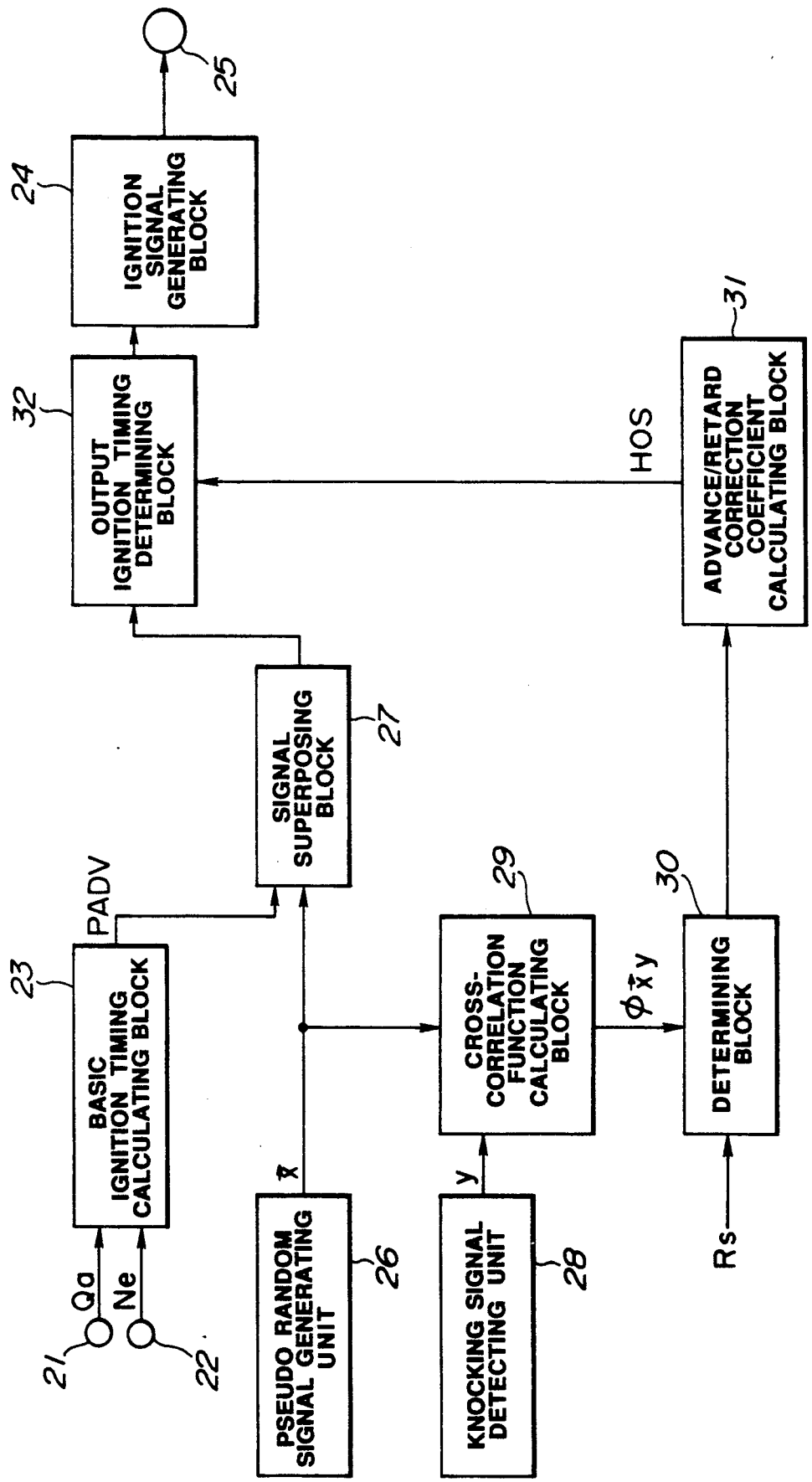
FIG. 1 is a functional circuit block diagram of a system for controlling an ignition timing for an internal combustion engine in a preferred embodiment according to the present invention.

FIG. 1 shows a functional block diagram of a system for controlling an ignition timing applicable to an internal combustion engine.

In FIG. 1, two sensors 21, 22 are installed on the engine for detecting an engine load (,e.g., intake air quantity Qa) and an engine revolution speed Ne. A basic ignition timing calculating block 23 calculates a basic ignition timing PADV on the basis of the values detected and output by the two sensors 21, 22. An ignition timing signal generating block 24 generates the ignition timing signal according to the ignition timing angle PADV. An ignition device 25 carries out ignition upon the receipt of the ignition signal. In addition, the ignition timing controlling system includes a unit 26 generating a pseudo random signal of minute period (for example, M-series sequence signal $\vec{\chi}$ (t) (Maximum-length Linear Feedback Shift Register Sequence), a superimposing unit 27 for superimposing the pseudo random signal on the signal representing the ignition timing, a detecting block 28 for detecting an engine knocking signal y which minutely changes by the superimposition of the pseudo random signal on the ignition timing signal, a calculating block 29 for calculating a cross-correlation function $\phi \vec{\chi}$ y from both signal y and the pseudo random signal $\vec{\chi}$., a determining block 30 for determining whether the cross-correlation function coincides with a predetermined target value Rs, a block 31 for calculating an advance/retard correction coefficient HOS so that the cross-correlation function $\Phi \vec{\chi}$ y coincides with the predetermined target value Rs, and a block 32 for correcting the basic ignition timing with the advance/retard angle correction coefficient HOS and for determining the output ignition timing.

According to the present invention, the cross-correlation function $\phi_\chi$ y of the pseudo random signal $\vec{\chi}$ which minutely changes the ignition timing and the knocking signal y is used to grasp a magnitude of the actual knocking. Then, the ignition timing is controlled so as to advance or retard the basic ignition timing in order for the cross-correlation function to coincide with the predetermined target value Rs defined as a proximity value over which severe knocking would occur. Consequently, although the ignition timing is controlled so as to reach a value near to the knocking limit, the actual level does not exceed the knocking limit.

Figure 2A:
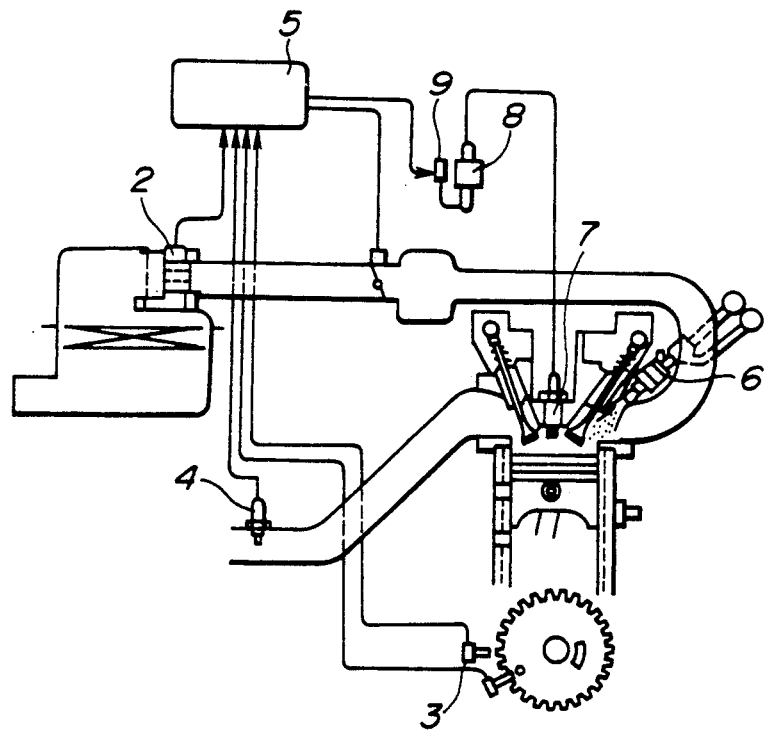
FIG. 2 (A) is a schematic block diagram of the system shown in FIG. 1 applicable to the engine.
Figure 2B:
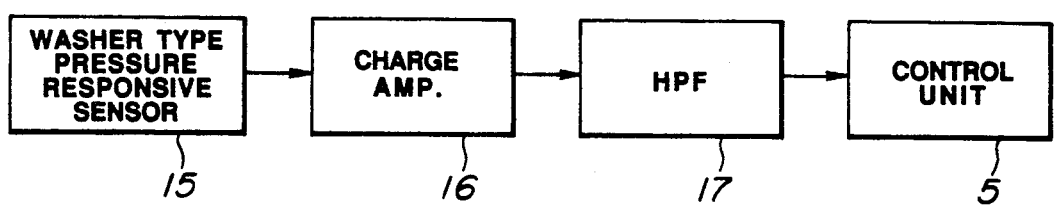

FIG. 2 (A) shows a mechanical structure of the ignition timing controlling system shown in FIG. 1.

In FIG. 2 (B), an airflow meter 2 detects an intake air quantity Qa and a crank angle sensor 3 detects an engine revolution speed Ne, and an air-fuel mixture ratio sensor 4 (oxygen concentration sensor) detects an air-fuel mixture ratio λ from an oxygen concentration in an exhaust gas. These sensors are input in a control unit 5.

A knocking signal detecting unit is shown in FIG. 2 (B). The knocking signal detecting unit is constituted by a pressure responsive sensor (knocking sensor) 15 formed in a washer shape of an ignition plug 7, a charge amplifier 16, and a high pass filter (HPF) 17. The pressure responsive sensor 15 converts a pressure variation generated within a combustion chamber into an electric charge quantity. The electric charge quantity is represented by the signal and it is converted into a voltage signal by means of a charge amplifier 16. Then, only frequency components characteristic to the knocking from the voltage signal (high frequency components in a range from 6 to 8 KHz) are selected by means of the high pass filter (HPF) 17. The selected knocking signal is also input to the control unit 5. The structure shown in FIG. 2 (B) is exemplified by U.S. Pats. No. 4,750,103 issued on Jan. 7, 1988 and No. 4,640,249 issued on Feb. 3, 1987, the disclosures of which are herein incorporated by reference.

In FIG. 2 (A), the control unit 5 supplying the ignition signal to a power transistor 9 carries out knocking control in accordance with the operational flowcharts shown in FIG. 3 through 5. It is noted that numeral 7 denotes an ignition plug, numeral 8 denotes the ignition coil, and the ignition device shown in FIG. 1 is constituted by the ignition plugs 7, ignition coil 8, and a power transistor 9.

FIG. 3 shows a program routine executed by the control unit 5 on the basis of which an M-series sequence signal, which is a pseudo random signal, is superimposed on the ignition timing signal.

It is noted that the generation of the M-series sequence signal is exemplified by U.S. Pat. Nos. 4,706,245 issued on Nov. 10, 1987 and 4,799,218 issued on Jan. 17, 1989, the disclosures of which are herein incorporated by reference. The structure of generating the M-series sequence signal includes an (or plurality of) Exclusive-OR gate circuit and a plurality of shift registers, the number of shift registers corresponding to N (to be described below).

In FIG. 3, the control unit 5 determines whether the engine driving condition falls in a steady state condition. If the engine falls in the steady state condition, the routine goes to a step S2. In the step S2, the control unit 5 is operated as the signal superimposing block 27 in FIG. 1.

That is to say, in the step S2, the M-series sequence signal $\vec{x}$ (t) is superimposed on a timing value θB BTDC (Before Top Dead Center) calculated in the same way as in a previously proposed ignition timing controlling system to be described later.

In details, the ignition timing $\theta$[BTDC] is calculated as follows:

$$\theta = \theta B + \vec{\chi}(t) \tag{1}$$

A portion of the ignition timing controlling system which outputs the ignition signal is an interface installed in the control unit 5. The interface serves as the ignition signal generating block 24 in FIG. 1.

On the other hand, in a step S3, $\theta = \theta B$ since in a transient operating condition, the M-series sequence signal does not superimpose on the ignition signal.

The M-series sequence signal $\chi$ (t) has a periodic function of parameters of an amplitude of a, minimum pulsewidth $\Delta$, a period N $\Delta$ (N denotes 15 in the preferred embodiment at the maximum sequence, but N can may alternately be 7, 3, or 1). It is noted that an auto-correlation function of the M-series sequence signal denoted by $\phi\vec{\chi}\vec{\chi}$ ($\tau$) is also the periodic function and is formed in a periodic pulse train of a triangular shape of smaller width, as shown in FIG. 6. This M-series sequence signal is a minute (dither) signal. Therefore, even if the M-series sequence signal is superimposed on the ignition signal, no major variation of engine revolution occurs the signal in no way affects the drivers feeling in handling the vehicle. It is noted that in place of the M-series sequence signal, an L-series sequence signal or twin prime number series sequence signal may be used.

FIG. 4 shows a program routine executed by the control unit 5 to determine whether the actual knocking level is placed in a vicinity of the knocking limit and to determine the advance/retard angle correction coefficient of the ignition timing according to the result of the determination.

In a step S11, the control unit 5 stores the data of the M-series sequence signal $\vec{\chi}$ and the knocking signal y based on the M-series sequence signal for each constant period.

In a step S12, the control unit 5 determines whether the M-series sequence signal $\vec{\chi}$ and the knocking signal y are input at one constant period. If the input of data is ended, the routine goes to a step S13.

In the step S13, the cross-correlation function calculating block in FIG. 1, i.e., the control unit 5 calculates the cross-correlation function $\phi\vec{\chi}y(\alpha)$ between the M-series sequence signal $\vec{\chi}$ and the knocking signal using the following equation:

$$\phi\vec{\chi}y(\alpha) = \int_0^{N\Delta} y(t) \cdot \vec{\chi}(\alpha - t)dt \tag{2}$$

In the actual practice, since digital signal processing (DSP) is carried out within the control unit, the right term of the equation (2) is converted into an integrated value. In more detail, the actual control system is constituted by a discrete value system.

In a step S14, the control unit 5 serves as the determination block 30 in FIG. 1. In steps of S15 through S17, the control unit 5 serves as the advance/retard angle correction coefficient calculating block 31 in FIG. 1. In the step S14, the control unit 5 compares the cross-correlation function $\phi\vec{\chi}y(\alpha)$ derived in the step S13 with a predetermined target value Rs. If $\phi\vec{\chi}y(\alpha) > Rs$ in the step S14, the control unit 5 determines that the knocking level exceeds the target value Rs and the routine goes to a step S15. Then, the control unit 5 subtracts a retard correction coefficient TIK from a correction coefficient HOS [*]. Conversely, if $\phi\vec{\chi}y(\alpha) < Rs$, the control unit 5 determines that severe knocking does not occur even if the ignition timing is advanced to provide a better combustion state. Then, the routine goes to a step S16.

In the step S16, the control unit 5 adds the advance angle correction coefficient SIN to the correction coefficient HOS. If $\phi\vec{\chi}y(\alpha) = Rs$ in the step S14, the routine goes to a step S17 in which the ignition timing is fixed, i.e., no retardation nor advance of the ignition timing angle is carried out. It is noted that HOS is a reference value defined from the engine load and revolution speed.

The reason that the advance/retard correction coefficient of the ignition timing is calculated according to a result of comparison between $\phi\vec{\chi}y(\alpha)$ and Rs will be described below.

In a case where the ignition timing is not advanced to such a degree that engine knocking is not caused to occur, a large change in the knocking level will not occur even if the ignition timing is advanced or retarded to some degree. In other words, in this case, there is no mutual correlation between the ignition timing and the knocking level (,i.e., a value of the cross-correlation function $\phi\vec{\chi}y(\alpha)$ becomes substantially zero). However, as the ignition timing becomes advanced toward a region near to the knocking limit, the combustion state largely affects the generation of the knocking. In this case, a minor change of the ignition timing causes a larger change in the knocking level. In other words, the correlation between ignition timing and knocking level becomes close. That is to say, the value of $\phi\vec{\chi}y(\alpha)$ becomes substantially one. In this way, the value of the cross-correlation function represents a magnitude by which the knocking occurs.

Hence, if the engine is to be driven at a region placed in the vicinity of the knocking limit, the value corresponding to the cross-correlation function in a case where the engine is driven at the region placed in the vicinity of the knocking limit is defined as the predetermined target value Rs. If $\phi > Rs$, the ignition timing is retarded so as to suppress the combustion. If $\phi < Rs$, the ignition timing is more advanced so as to approach to the knocking limit side.

It is noted that it is preferable to provide a dead zone, (or hysteresis) for the value of Rs and this makes the control stable.

FIG. 5 shows a program routine executed by the control unit 5 to calculate the output ignition timing $\theta B$.

In steps S21 and S22, the control unit 5 serves as the basic ignition timing calculating block 23 in FIG. 1. In the step S21, the control unit 5 reads the engine revolution speed N and the engine load, i.e., in the preferred embodiment, a basic fuel injection pulsewidth Tp (Tp=K·Qa/Ne, provided that K denotes a constant). In the step S22, the control unit 5 refers to a map to derive the basic ignition timing angle PADV [BTDC].

In a step S23, the control unit 5 serves as the output ignition timing determining block 32 in FIG. 1. In this step, the control unit 5 calculates the output ignition timing $\theta B$ [BTDC] using the following equation.

$$\theta B = PADV + HOS \tag{3}$$

If HOS<0 in the equation (3), the output ignition timing is advanced. If HOS<0, the output ignition timing is retarded.

Figure 8:
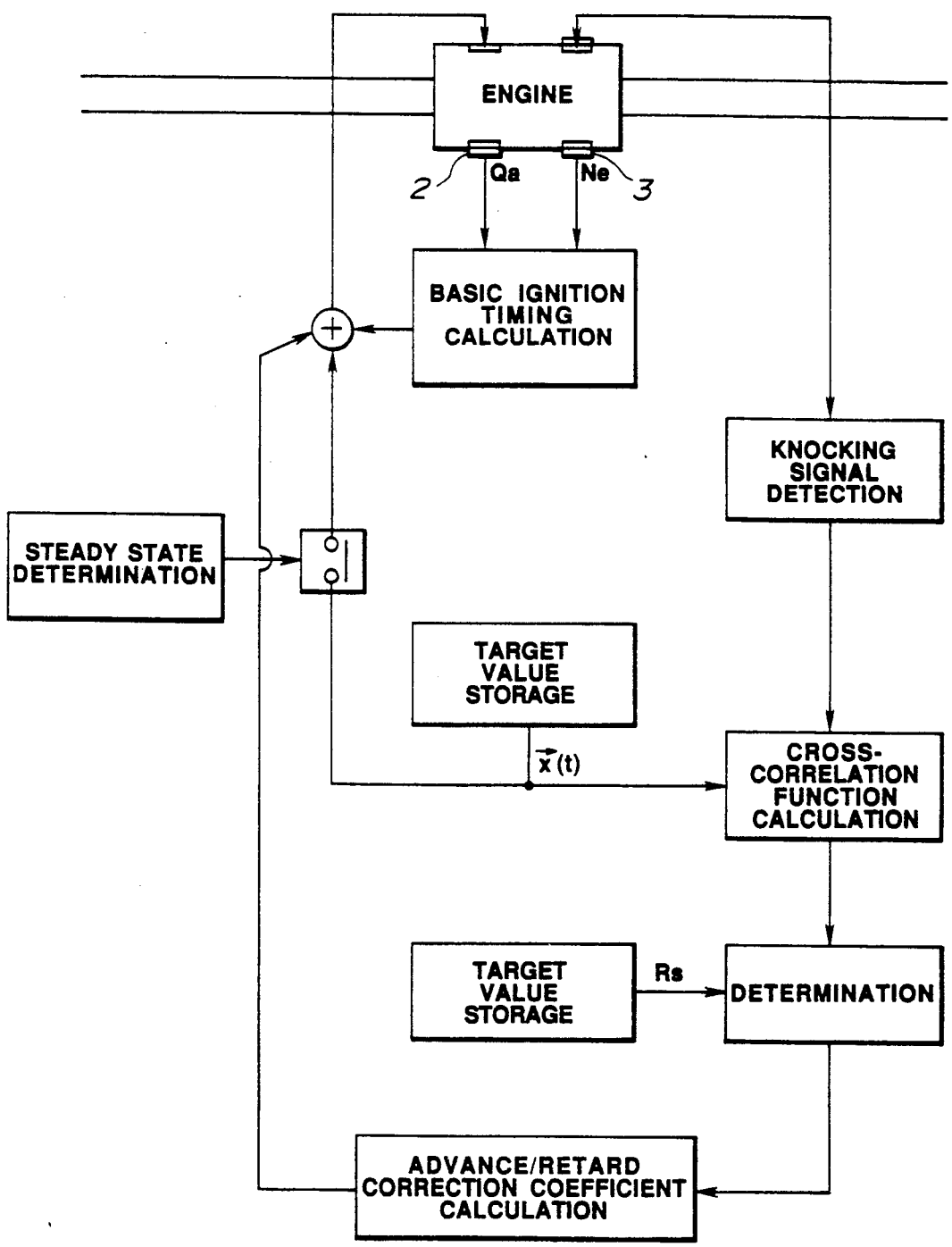
FIG. 8 is a control block diagram of another preferred embodiment of the system for controlling ignition timing for an internal combustion engine.

FIG. 8 shows a functional block diagram of the ignition timing controlling system which corresponds to the program routines shown in FIG. 3 through FIG. 5. The control unit 5 is constituted by a microcomputer having a CPU, ROM, RAM, and I/O interface.

Next, an operation of the preferred embodiment will be described below.

In this embodiment, the cross-correlation function $\phi\vec{\chi}y(\alpha)$ between the M-series sequence signal $\chi$ and knocking signal y is derived to grasp the magnitude of the knocking. This is because as the ignition timing becomes nearer to the knocking limit, the correlation between the ignition timing and knocking level becomes closer so that the value of the cross-correlation function $\phi\vec{\chi}y(\alpha)$ becomes larger.

Then, if the value of $\phi\chi y(\alpha)$ exceeds the target value Rs defined as the value placed in the vicinity of the knocking limit, the ignition timing is retarded by the value of HOS. On the other hand, if the value of $\phi\vec{\chi}y(\alpha)$ is below the value of Rs, the ignition timing is advanced by the value of HOS. Consequently, the actual knocking level of the engine is controlled so as to reach the target value placed in the vicinity of the knocking limit so that the value of $\phi\vec{\chi}y(\alpha)$ coincides with the target value of Rs.

Figure 7:
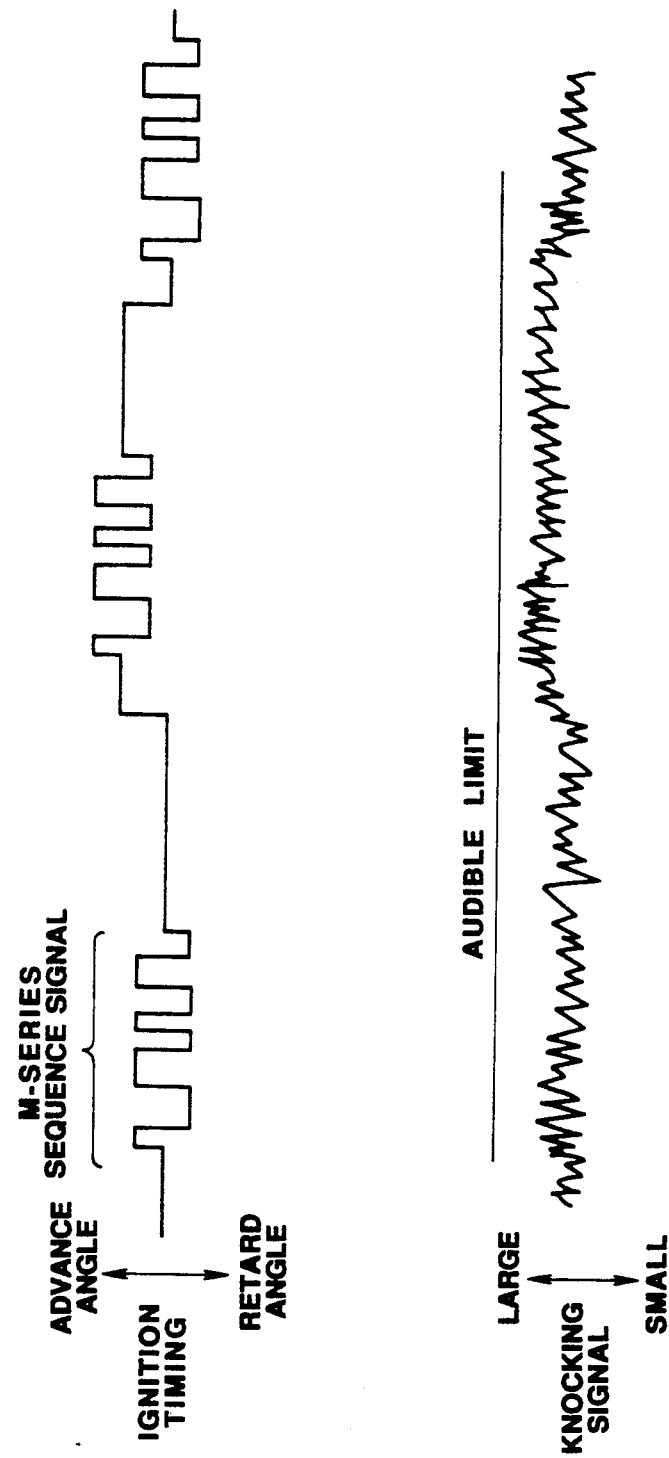
FIG. 7 is a waveform chart for explaining an operation of the preferred embodiment shown in FIGS. 1 through 2 (B).

As shown in FIG. 7, the actual knocking level settles down at a position having a little leeway relative the knocking limit without exceeding the knocking limit (in the drawings, it is denoted as an audible limit).

In other words, in the preferred embodiment, when the ignition timing is controlled toward the target value defined in the vicinity of the knocking limit, the ignition timing does not exceed the knocking limit. Thus control accuracy is improved.

On the other hand, in the previously proposed ignition timing controlling system described in the BACKGROUND OF THE INVENTION, the control of the ignition timing to place it in the vicinity of the knocking limit becomes possible only if the ignition timing exceeds the knocking limit.

It is noted that although the M-series sequence signal is superimposed on the ignition signal during the engine driving in order to determine whether the knocking level is placed in the vicinity of the limit, the level of the M-series sequence signal is minute and the superimposition is carried out during the steady state condition. Therefore, no change in the engine operating condition may result. It is also noted that the advance/retard correction coefficient HOS may be constituted by a learning value.

As described hereinabove, since, in the ignition timing controlling system and method, the cross-correlation function between the pseudo random signal superimposed on the ignition signal related to the ignition timing and the knocking signal is derived using the cross-correlation method in which the pseudo random signal is superimposed and the ignition timing is corrected to as to retard or advance from the normal ignition timing so that this cross-correlation function coincides with the predetermined target value Rs, the ignition timing of the engine can be controlled so as to place it near to the knocking limit without exceeding the knocking limit.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A system for controlling ignition timing for an internal combustion engine, comprising:
   a) first means for detecting an engine revolution speed and an engine load;
   b) second means for calculating a basic ignition timing value on the basis of the detected engine revolution speed and engine load;
   c) third means for generating an ignition signal at a timing calculated by the second means and igniting air-fuel mixture supplied to the engine in response to the ignition signal;
   d) fourth means for generating a periodic pseudo random signal;
   e) fifth means for superimposing the periodic pseudo random signal on the ignition signal;
   f) sixth means for detecting engine knocking and outputting an engine knocking level signal which changes due to the superimposition of the periodic pseudo random signal;
   g) seventh means for calculating a cross-correlation function of both the knocking level signal and pseudo random signal;
   h) eighth means for determining whether the cross-correlation function coincides with a predetermined target value;
   i) ninth means for calculating an advance/retardation correction coefficient of the ignition timing so that the cross-correlation function coincides with the predetermined target value; and
   j) tenth means for correcting the basic ignition timing value according to the calculated advance/retardation correction coefficient and determining an output ignition timing value.

2. A system as set forth in claim 1, which further includes eleventh means for determining whether an engine driving condition falls in a steady state, and wherein the fifth means superimposes the periodic pseudo random signal when the engine driving condition falls in the steady state condition.

3. A system as set forth in claim 2, wherein the periodic pseudo random signal is an M-series sequence signal.

4. A system as set forth in claim 3, wherein the seventh means calculates the cross-correlation function using the following equation:

$$\phi\vec{\chi}y(\alpha) = \int_0^{N\Delta} y(t) \cdot \vec{\chi}(\alpha - t)dt$$

wherein y(t) denotes the function of the knocking level signal with time t, $\chi(\alpha-t)dt$ denotes the function of the M-series sequence signal, and $N\Delta$ denotes one period of the M-series sequence signal.

5. A system as set forth in claim 4, wherein the M-series sequence signal is superimposed on the ignition signal representing the ignition timing in the following way: $\theta = \theta B + \vec{\chi}(t)$ 6. A system as set forth in claim 5, wherein the eighth means compares the value of the cross-correlation function with the predetermined target value and wherein the ninth means subtracts a retardation angle correction coefficient TIK from a correction coefficient HOS when the value of cross-correlation function exceeds the predetermined target value Rs, the correction coefficient HOS being determined according to the engine revolution speed and engine load.

7. A system as set forth in claim 6, wherein the ninth means adds an advance angle correction coefficient SIN to the correction coefficient HOS when the value of the cross-correlation function is below the predetermined target value.

8. A system as set forth in claim 7, wherein the tenth means calculates the output ignition timing using the following equation:

$$\theta B = PADV + HOS,$$

wherein PADV denotes the basic ignition timing value derived by the second means.

9. A system as set forth in claim 8, wherein the ignition signal denoted by $\theta$ is output when $\theta$ equals $\theta B$ when the engine driving condition falls in a transient state.

10. A system as set forth in claim 4, wherein the M-series sequence signal has an amplitude of a, a minimum pulsewidth of $\Delta$, and one period denoted by $N\Delta$.

11. A system as set forth in claim 9, wherein the predetermined target value is a value of the corresponding cross-correlation function which is equivalent to the ignition timing angle placed in the vicinity of the knocking limit.

12. A method for controlling ignition timing for all internal combustion engine to suppress engine knocking, comprising the steps of:
 a) detecting an engine revolution speed and n engine load;
 b) calculating a basic ignition timing value on the basis of the detected engine revolution speed and engine load;
 c) generating an ignition signal at a timing calculated in the step b) and igniting air fuel mixture supplied to the engine in response to the ignition signal
 d) generating a periodic pseudo random signal;
 e) superimposing the periodic pseudo random signal on the ignition signal;
 f) detecting engine knocking and outputting an engine knocking level signal which changes due to the superimposition of the periodic pseudo random signal;
 g) calculating a cross-correlation function of both the knocking level signal and pseudo random signal;
 h) determining whether the cross-correlation function coincides with a predetermined target value;
 i) calculating an advance/retardation correction coefficient of the ignition timing so that the cross-correlation function coincides with the predetermined target value; and
 j) correcting the basic ignition timing value according to the calculated advance/retardation correction coefficient and determining an output ignition timing value.

* * * * *